United States Patent
Nehemiah et al.

[11] Patent Number: 5,956,291
[45] Date of Patent: Sep. 21, 1999

[54] UNDERWATER DIVING ASSISTANT APPARATUS

[75] Inventors: Jerome L. Nehemiah, Los Gatos, Calif.; Anthony J. Catalano; Randolph D. Glickman, both of San Antonio, Tex.

[73] Assignee: Ductech, LLC, Los Gatos, Calif.

[21] Appl. No.: 09/062,374

[22] Filed: Apr. 17, 1998

[51] Int. Cl.⁶ .................................................. H04B 11/00
[52] U.S. Cl. ........................................... 367/131; 367/134
[58] Field of Search ..................................... 367/131, 134

[56] References Cited

U.S. PATENT DOCUMENTS

| | | |
|---|---|---|
| 4,039,999 | 8/1977 | Weston . |
| 4,102,203 | 7/1978 | Sylvester et al. ........................... 73/620 |
| 4,208,734 | 6/1980 | Garber, Jr. et al. ...................... 367/134 |
| 4,210,971 | 7/1980 | Martin, Jr. ................................ 367/134 |
| 4,563,758 | 1/1986 | Paternostro ............................... 367/134 |
| 4,679,177 | 7/1987 | Aoyagi et al. ............................ 367/132 |
| 4,839,871 | 6/1989 | Massey ...................................... 367/132 |
| 4,882,678 | 11/1989 | Hollis et al. . |
| 4,975,890 | 12/1990 | Wolf et al. ................................ 367/131 |
| 5,029,147 | 7/1991 | Andrews et al. ......................... 367/134 |
| 5,121,366 | 6/1992 | Wayner et al. ........................... 367/134 |
| 5,124,955 | 6/1992 | Jackson et al. .......................... 367/134 |
| 5,267,070 | 11/1993 | Stewart et al. ........................... 359/141 |
| 5,299,043 | 3/1994 | Taylor et al. .............................. 359/83 |
| 5,301,167 | 4/1994 | Proakis et al. ........................... 367/134 |
| 5,438,363 | 8/1995 | Ejima et al. .............................. 348/223 |
| 5,450,810 | 9/1995 | Knight ........................................ 116/26 |
| 5,523,982 | 6/1996 | Dale .......................................... 367/131 |
| 5,592,156 | 1/1997 | James ........................................ 340/850 |

OTHER PUBLICATIONS

Digital Ocean TARPON; 1996; two–page advertisement.
C.H. Blickenstorfer; "Hammerhead 586"; Feb. 1986; pp. 27–30; *Pen Computing Magazine*.
Anthony, The Ultimate Personal Peripheral, PC Magazine, pp. 100–124, Mar. 1998.
Brown, Palm Co–Pilot, PC Magazine, p. 56, Sep. 1998.

*Primary Examiner*—Daniel T. Pihulic
*Attorney, Agent, or Firm*—Blakely, Sokoloff, Taylor & Zafman LLP

[57] ABSTRACT

An underwater diving assistant device. In one embodiment, the present invention comprises a hand-held unit including a display screen. Messages and drawings are written on the display screen using a passive electromagnetic pen. Markings on the screen can be instantly cleared, stored or transmitted to another, similar device by placing the electromagnetic pen in proximity to a command icon on the screen. The unit includes standard dive computer functions. In one embodiment, the unit includes a digital camera and a vessel locator, and generates audible tones under various circumstances. In one embodiment, a power source of the unit is stored in a container fastened to a diver's weight belt and is connected by a tether to the unit.

26 Claims, 3 Drawing Sheets

UNDERWATER DIVING ASSISTANT APPARATUS

FIELD OF THE INVENTION

The present invention is in the field of computing devices. More particularly, the present invention is in the field of computing devices useful underwater.

BACKGROUND OF THE INVENTION

Various devices exist for assisting scuba divers during excursions underwater for recreation or work. Most of these devices perform functions in one of two important classes. Some of the devices perform some functions of both classes. The first class of functions is "dive computer" functions. Dive computers assist a diver by calculating and displaying information such as water depth, water temperature, and time-at-depth. Dive computers also calculate and display necessary information such as no-decompression and decompression dive limits using standard dive algorithms.

The second class of functions is data assistant/communication functions. Electronic devices in this class for use underwater include devices that display messages and generate tones under certain circumstances. For example, U.S. Pat. No. 4,563,758 to Paternostro, describes a device that is capable of displaying preprogrammed messages when a key of a keyboard is pressed, or of displaying messages typed on the keyboard. This device has disadvantages. For example, only a certain number of preprogrammed messages are available to be displayed easily by pressing a single key or button. In addition, it is not possible to formulate individualized messages without the cumbersome process of keying in the message using a small keyboard. Another disadvantage is that there is no capability to store individualized messages and recall them for reuse. It is also not possible to hand draw figures on the device.

Devices used to communicate with other divers include mechanical writing slates. Mechanical writing slates are difficult to read at depth because of the lack of available light. Mechanical writing slates also have the disadvantage of requiring that writing to be erased, or cleared from the slate surface must cleared by either a mechanical device or by manual erasure. Recently, voice acoustic transmission devices have become commercially available, but are expensive and cumbersome to use, and written messages or drawn objects cannot be displayed with these devices.

Various, specialized devices can be used by divers to perform additional function such as digital image capture, electronic boat finding and navigation. Typically, these devices are individual devices that must each be carried separately by a diver.

For scuba diving to be safe, efficient, and enjoyable, it is necessary to be able to make calculations using dive algorithms easily and to communicate effectively with dive "buddies". Currently, no device allows a diver to hand write or draw information electronically, clear or store and retrieve the information, or remotely communicate the hand drawn information to a diving buddy. Also, no device currently incorporates these functions in a single package with specialized functions such as digital image capture, boat finding and navigation.

SUMMARY OF THE INVENTION

An underwater diving assistant device is described. In one embodiment, the present invention comprises a hand-held unit including a display screen. Messages and drawings are written on the display screen using a passive electromagnetic pen. Markings on the screen can be instantly cleared, stored or transmitted to another, similar device by placing the electromagnetic pen in proximity to a command icon on the screen. The unit includes standard dive computer functions. In one embodiment, the unit includes a digital camera and a vessel locator and generates audible tones under various circumstances. In one embodiment, a power source of the unit is stored in a container fastened to a diver's weight belt and is connected by a tether to the unit.

DETAILED DESCRIPTION

In one embodiment, the present invention is a hand-held unit capable of performing conventional dive computer functions in addition to providing a writing slate upon which individualized messages or drawings can be electronically marked by hand. In one embodiment the unit is capable of wireless communication with other units, including the transmission of messages or drawings marked on the screen of one unit to the screen of another unit.

Figure 1:
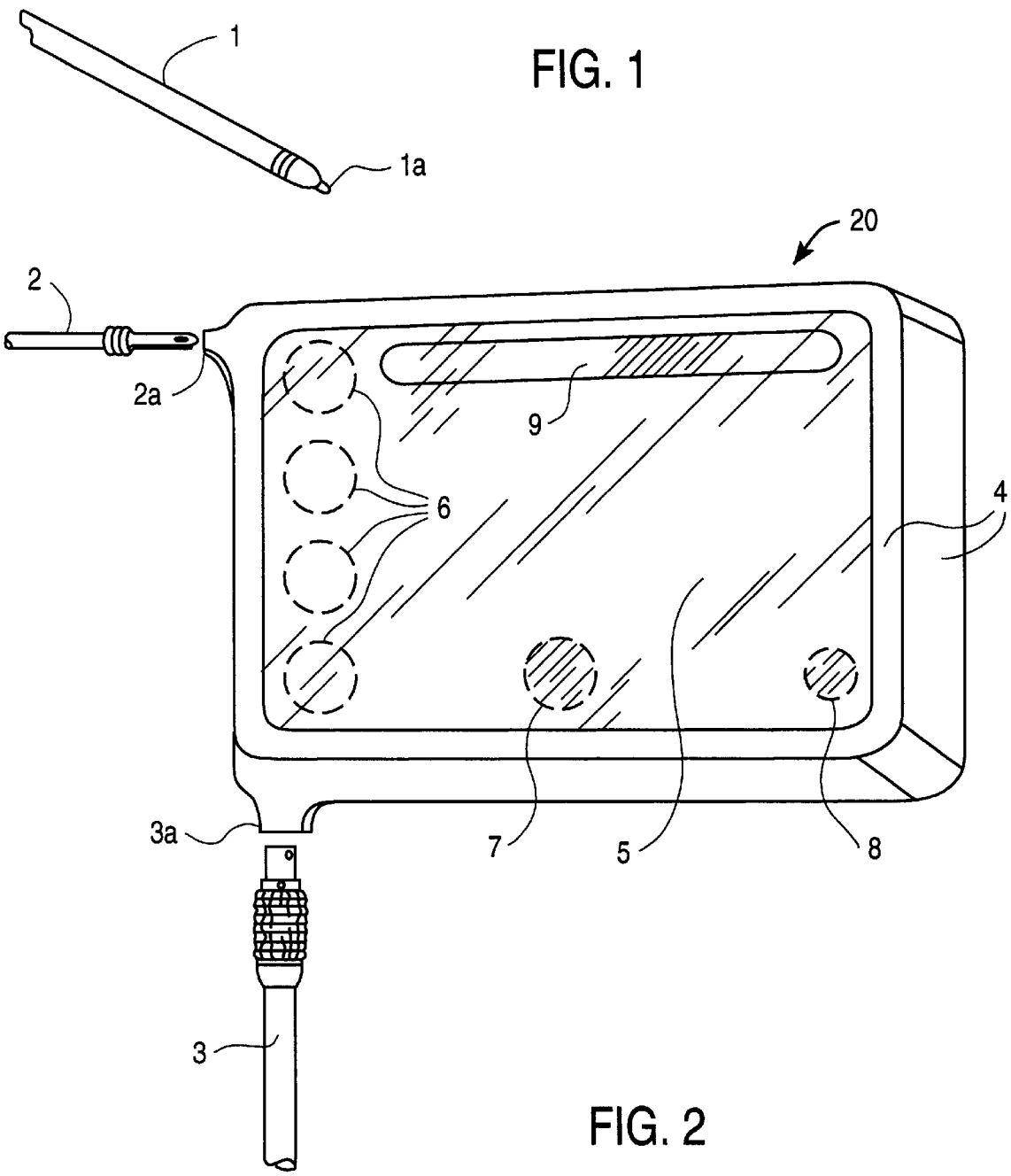
FIG. 1 is a diagram of one embodiment of the present invention.

FIG. 1 is a diagram of one embodiment of the present invention. This embodiment includes hand-held unit 20 and electromagnetic digitizer pen digitizer 1. Pen digitizer 1 is used to make markings that are visible through faceplate 5. The function of pen digitizer 1 is explained in more detail below. Pen digitizer 1 is connected to unit 20 through waterproof receptacle 2a.

Hand-held unit 20 includes casing 4 and faceplate 5. Casing 4 includes sides, perimeter fascia and back (not shown) of a high impact material. Casing 4, in one embodiment, is die-cast metal alloy integrated with faceplate 5. Other embodiments include casings of other durable materials, such as high impact plastic. Faceplate 5 may be a tempered glass window through which a liquid crystal display (LCD) is viewed. In other embodiments. other types of displays, such as, for example, plasma displays or field emissive displays (FEDs) could be used. Faceplate 5 is held in place using a gasketed metal bezel. Casing 4 is filled with a layer of silicon-based gel to help resist external water pressure and provide moisture protection for the sensitive internal electronics.

Beneath faceplate 5 in one embodiment is a flatpanel display assembly visible to the user through the faceplate. One embodiment of the flatpanel assembly will be described in more detail below. The user draws or writes on faceplate 5 by holding pen digitizer 1 as an ordinary pen and bringing pen tip 1a in close proximity to the surface of faceplate 5 or touching faceplate 5. In one embodiment, pen digitizer 1 is a pen digitizer commercially available from, for example, Wacom Company, of Vancouver, Wash. Because pen digitizer 1 does not produce marks through pressure applied to a screen, unit 20 operates underwater without the problem of water pressure marking the display. In addition, because the markings on the display are electronic, they are self-illuminated and therefore visible even at depths where the ambient light is very low. Pen digitizer 1 is modified to operate underwater at depth. For example, pen digitizer 1 and pen tip 1a are enclosed in a waterproof casing injected with a layer of silicon gel.

Casing 4 and faceplate 5 fit together to form a waterproof and pressure resistant casing for electronic components therein. Hand-held unit 20 and pen digitizer 1 are watertight and pressure proof to any reasonable depth within the range of sport and commercial scuba diving.

In one embodiment, hand-held unit 20 operates as an electronic writing slate, a communication device, and a dive computer. Hand-held unit 20 is operated, at least in part, using pen digitizer 1. A user writes on hand-held unit 20 using pen digitizer 1 and also controls various functions by bringing pen tip 1a in proximity to various touch sensitive icons 6, 7, and 8 visible through faceplate 5. For example, the writing slate function can be activated by touching one of icons 6 preprogrammed for this function. When the icon is touched, the device functions as a writing and drawing slate. Any writings or drawings visible through faceplate 5 can be cleared or stored by touching another icon 6 that functions as a store icon, preprogrammed to function in this capacity. The electronics enclosed in casing 4 and faceplate 5 control the functions of hand-held unit 20 through hardware and software according to conventional methods.

Writings or drawings created using pen digitizer 1 can be stored after being associated with a certain icon. Thereafter, when the icon is "touched" by pen tip 1a, the drawing or writing will be retrieved from a memory device and displayed. It is also possible to use one of command icons 6 to transmit writings or drawings to another hand-held unit similar to hand-held unit 20 or other device using an ultrasonic transducer, as will be explained more fully below.

Screen icons can be used very flexibly, as programmed by internal software, to allow a great variety of functions to be performed. Command icons can be used to activate any conventional dive computer functions such as, for example, displaying a compass reading, displaying traditional dive time and depth information, and displaying preprogrammed alert messages. Accompanying audio alarms accompany preprogrammed alert messages displayed through faceplate 5. In one embodiment, the "dive computer" information is relegated to a constant display 9 along one portion of faceplate 5. Constant display 9 could be placed in a different section of faceplate 5 or be made larger or smaller. If a user does not desire to have the dive computer function activated, the display may be cleared by use of a command icon 6.

Preprogrammed emergency messages are displayed in large, bold letters through faceplate 5 when an isolated emergency icon, such as icon 7, is touched by pen tip 1a. In one embodiment, emergency icon 7 is isolated from other functional icons in order to provide unambiguous, rapid access to this icon in case of emergency. An acoustic signal may accompany activation of the emergency icon in order to increase the chances of attracting another divers attention underwater. A single preprogrammed message is activated by touching emergency icon 7. A message such as "going up" or "out of air" may be displayed and accompanied by an audible alarm. In addition, multiple messages may be activated in turn by repetitive touching of emergency icon 7 by touching pen tip 1a to emergency icon 7 until a desired message appears. In one embodiment, software of unit 20 is modifiable to allow a user to identify and store messages to be displayed for emergency purposes. In one embodiment, activating emergency icon 7 will automatically clear any existing writing or drawing currently displayed and replace it with the emergency message and accompanying audible alert. Icon 8 is an example of an icon placed by itself in a distinct section of faceplate 5 for any function that must be accessed easily and quickly. For example, a digital compass may be displayed in the center of faceplate 5, or in another portion of faceplate 5, by activating icon 8 which has been programmed for this purpose. Touching icon 8 a second time clears the compass from the display.

In one embodiment, an external power supply supplies power to hand-held unit 20 through waterproof connector 3, which plugs into waterproof receptacle 3a. The external power supply may be attached to a weight belt or buoyancy compensator. The power supply connector thus functions as a tether preventing the diver from losing hand-held unit 20. In other embodiments, hand-held unit 20 has an internal power supply that is rechargeable through receptacle 3a.

Figure 2:
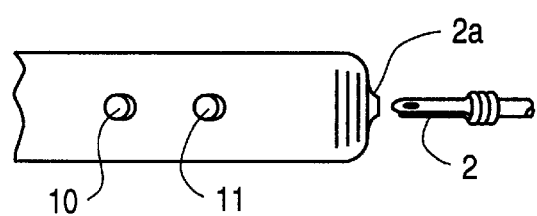
FIG. 2 is a side view of one embodiment.

FIG. 2 is a side view of one embodiment of hand-held unit 20. Waterproof apertures 10 and 11 are shown. In one embodiment, waterproof aperture 10 houses a compass sensor and waterproof aperture 11 provides an opening for a digital camera lens subsystem. In various embodiments, waterproof apertures may be added for various devices that require access from the interior of hand-held unit 20 to the exterior of hand-held unit 20.

Figure 3:
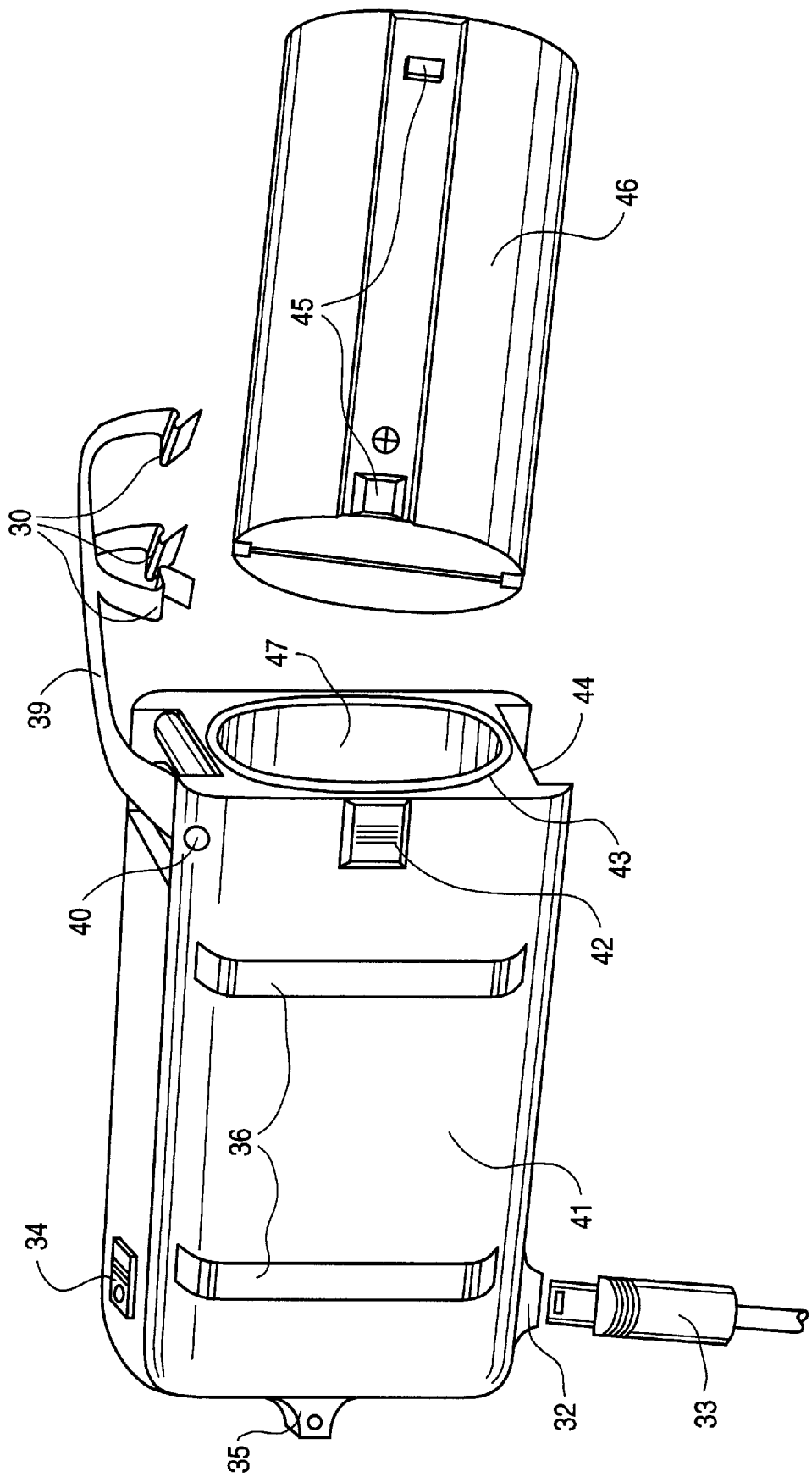
FIG. 3 is a diagram of one embodiment of a power source and housing.

FIG. 3 is a diagram of a power source and housing for an embodiment, such as the embodiment of FIG. 1, using a power source that is remote from hand-held unit 20. Housing 41 includes an opening 47 sized to accept battery 46. Housing 41 includes contacts (not shown) that are placed in contact with battery contacts 45 when battery 46 is placed in housing 41.

In one embodiment, battery 46 is a typical lead-acid battery which provides 12 volts direct current (DC). Other types of batteries, such as lithium ion (Li), or nickel metal hydride (Nimh), could also be used. Waterproof cable 33 may be of a coiled type to allow for easy retraction of unit 20 to the diver's waist area when not in use. Connectors on the power cable may be environmentally sealed with spring-loaded release latches to reduce the possibility of inadvertent disconnection while unit 20 is in use. Housing 41 with battery 46 may be used in conjunction with or in place of standard belt weights.

Housing 41 includes cover 39, which is attached to housing 41 by snapping flexible members 30 into recessed portions 42 and 44. In other embodiments, cover 39 could be attached to housing 41 using a latching mechanism or screws instead of flexible members 30. Cover 39 is attached through hinge 40 to housing 41. O-ring 43 contacts cover 39 to form a waterproof and pressure proof seal.

Waterproof cable 33 plugs into port 32. Circuitry (not shown) internal to housing 41 is provided such that, when battery 46 is inserted in housing 41 and cable 33 is connected to unit 20, power from battery 46 flows to external port 32.

Housing 41 has a point of attachment 35 into which a ring can be threaded so that housing 41 can attach to a diver's buoyancy compensator or belt or wrist. Alternatively, belt loops 36 can be used to hang housing 41 on a diver's weight belt of standard weight belt dimensions, thus providing a convenient way of carrying the device underwater.

Figure 4:
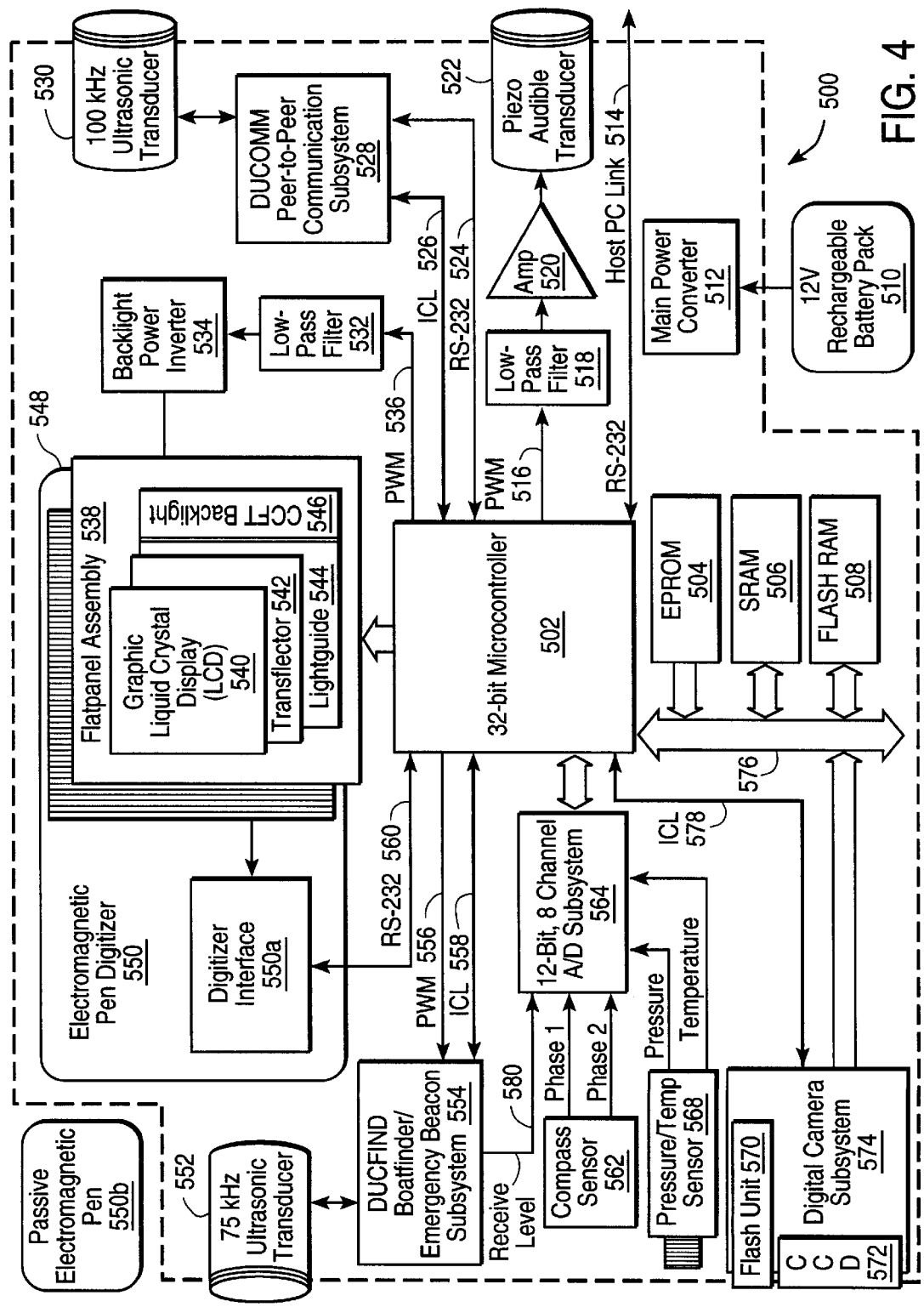
FIG. 4 is a functional block diagram of one embodiment.

FIG. 4 is a block diagram of internal electronic components of hand-held unit 20 according to one embodiment. Components 500 include the electronic components internal to hand-held unit 20. Components 500 are connected to power source 510. In one embodiment, power source 510 is a remote 12-volt rechargeable battery pack connected to hand-held unit 20 as shown in FIGS. 1 and 3. Power source 510 is connected to main power converter 512. Main power converter 512 provides power for components 500. Main power converter 512 converts the 12 volt supplied by external power source 510 into different voltages required by individual components 500. Main power converter 512 is a DC-to-DC type converter which produces +5 volts (VCC) for microcontroller 502 and associated logic/memory circuits. LCD 540 requires a negative driving voltage (VEE) in the range of −15 volts to −24 volts which is also generated by main power converter 512. Other components, such as audio amplifier 520 and backlight power inverter 534, are driven directly from the 12 volts supplied by external power source 510. Main power converter 512 also contains supervisory circuitry for monitoring the condition of the voltages and generating a reset to microcontroller 502 when necessary.

Passive electromagnetic pen 550b is shown external to components 500. Passive electromagnetic pen 550b is part of electromagnetic pen digitizer 550 along with digitizer interface 550a. Electromagnetic pen 550b interacts with digital interface 550a when pen 550b is brought into proximity with digitizer sensor board 548 so as to record marks on LCD 540.

Microcontroller 502 controls operations of the various components of hand-held unit 20. In one embodiment, microcontroller 502 is a 32-bit microcontroller that includes hardware and software functions necessary to control all aspects of hand-held unit 20. Microcontroller 502 is software programmed in a conventional manner to carry out monitoring and controlling functions of unit 20. Primary monitoring functions include such tasks as, for example, reading input from pen digitizer 550 and acquiring data from analog to digital (A/D) subsystem 564. Primary controlling functions include displaying text and graphics to LCD 540.

In one embodiment, microcontroller 502 is a microprocessor including a high level of integration to perform the diverse set of operational functions required by unit 20. Microcontroller 502 may be designed for high-speed operation and low power consumption. Microcontroller 502 includes the capability to interface directly with an LCD, non-volatile memory, and external peripherals. In one embodiment, microcontroller 502 also includes internal hardware functions for pulse width modulation (PWM), RS-232C serial communication via universal asynchronous receiver transmitters (UARTs), parallel communication via a multibit programmable peripheral interface, infrared communication, programmable counting and timing, clock and power management, and handling microprocessor interrupts. In one embodiment, microcontroller 502 may require external glue logic to interface to various types of external memory. External memory stores, for example, software instructions and algorithms that execute on and from unit 20.

A/D subsystem 564 converts external analog signals to the digital format required for use by software functions of microcontroller 502. The A/D subsystem incorporates sufficient channels for the conversion of analog signals originating from compass sensor 562, pressure/temperature sensor 568, and boat finder/emergency beacon subsystem 554. A/D subsystem 564 communicates with microcontroller 502 using a parallel interface by which binary data is transferred from A/D subsystem 564 to microcontroller 502 on command of microcontroller 502 and its operating software algorithms. A/D subsystem 564 is capable of transforming analog sensor signals to 12 bits of conversion resolution, or an equivalent digital range of 0–4,095 counts. Converted data is then translated into forms suitable for presentation to a diver using LCD 540.

Flatpanel assembly 548 is visible to a diver through faceplate 5 and serves two primary functions. First, it provides a means by which visual information, such as, for example, compass heading or current depth, is presented to the user and/or accompanying divers. Second, the display, used in conjunction with electromagnetic pen digitizer 550 including passive electromagnetic pen 550b, forms a basic writing slate for the diver to use as an electronic message pad. Messages written for display can be shown to a dive buddy, stored for later recall, and/or transmitted to a corresponding unit of a dive buddy.

In one embodiment, flatpanel assembly 538 includes four primary components: LCD 540; cold cathode fluorescent tube (CCFT) backlight 546; light guide 544; and partial reflector (transflector) 542 mounted between light guide 544 and LCD 540. LCD 540 itself is formed by a two-dimensional arrangement of picture elements or pixels. Each pixel is a liquid crystal cell which can be thought of as an electronically controlled miniature light shutter. LCD 540 is driven from digital data supplied by microcontroller 502. This digital data determines the on/off state of every pixel comprising the display. However, LCD 540 is a passive display device in that it does not itself generate light.

The on/off state of each liquid crystal cell, or pixel, determines whether or not light from CCFT backlight 546 is transmitted through LCD 540. In direct sunlight, it would be difficult, if not impossible, to read the display even with a bright backlight. In this case, transflector 542 lies directly behind LCD 540 and reflects ambient light back through the display to increase readability. To increase readability and dark ambient conditions, the light from CCFT backlight 546 shines down light guide 544 and through "pores" in transflector 542 to effectively backlight LCD 540.

Backlight power inverter 534 is responsible for powering CCFT 546, which is part of flatpanel assembly 538. CCFT 546 provides backlighting for passive LCD 540 to increase readability of the display in low light ambient conditions. Backlight power inverter 534 is a separate module which converts 12 volts supplied by external power source 510 to a high-voltage, high-frequency sinewave necessary to drive CCFT 546. Lamp current and resultant lamp brightness is controlled by an external voltage which can be fed into backlight power inverter 534. This control voltage is supplied by microcontroller 502 through pulse width modulator (PWM) channel 536 and external low-pass filter 532. These components in conjunction with software allow a diver to effectively dim and brighten LCD 540 as needed.

Electromagnetic pen digitizer 550 provides a mechanism with which a diver can interact with unit 20. Digitizer 550 includes electromagnetic sensor board 548, digitizer interface 550a, and passive electromagnetic pen 550b. Pen 550b is used by the diver as a standard computer interface pointing device to control functions of unit 20 and as an electronic writing device for creation of written messages and/or hand drawn graphics.

In the writing mode, microcontroller 502 is programmed to read the position of pen 550b as it is used to sketch on the face of LCD 540. Digitizer interface 550a reads the position of pen 550b when it is brought in close proximity to sensor board 548. Through software, the position of pen 550b is transferred to microcontroller 502 and converted to 2-dimensional digital coordinates corresponding to the placement of the tip of pen 550b relative to the spatial coordinates of the pixel elements of LCD 540. The corresponding pixels are highlighted (turned on) as pen 550b is moved across LCD 540 during normal handwriting motions representing a sort of electronic ink. The diver can write a message to show a dive buddy, clear the message and/or store the message to non-volatile random access memory (RAM) 508 for later retrieval.

In the control mode, digitizer interface 550a allows for a user to control certain functions of unit 20. As in the writing mode, digitizer 550 monitors the position of the pin as it is brought in close proximity to the face of LCD 540. The diver uses pen 550b to point to graphical icons on LCD 540. Each icon represents a particular function of unit 20 that is controllable by the diver, for example, determination of his or her current heading. To determine current heading, a diver uses pen 550b to point to the icon of a compass rose, and a graphical, electronic representation of a compass is presented on LCD 540 showing, in real-time, the diver's current heading. The diver may also use pen 550b to select a preprogrammed message to communicate to a nearby diver using peer-to-peer ultrasonic communication system 528 and 530. Pen digitizer 550 is a powerful input tool because functions are implemented through "soft" control panels presented on display 540. Additions or modifications of functions require only software reprogramming rather than physical alteration of unit 20.

Pressure/temperature sensor 568 provides readings of temperature and pressure external to unit 20. Sensor 568 may be mounted to an inside wall of casing 4 and protrudes through an orifice therein to allow exposure to the external water environment. In one embodiment, sensor 568 provides analog signals proportional to the values of temperature and pressure that are fed into A/D subsystem 564 for conversion to digital values. The digital values are converted to standard units of degrees and pounds per square inch by software executing on microcontroller 502. These environmental measurements are updated continuously while the unit is powered, and may be displayed to the user in numerical and/or graphical format, logged in memory for later recall and review, or used in traditional dive decompression algorithms.

Compass sensor 562 is integrated into the internal circuitry of unit 20 to provide an indication of direction or heading. Sensor 562 is slightly damped as it detects the earth's magnetic field so that indications are similar to those of a standard liquid-filled compass. Two out-of-phase signals are produced by sensor 562 and fed into respective channels of A/D subsystem 564 for conversion to digital values. The resultant numerical values are converted to a digital reading of degrees (0°–360°) relative to due North which is then displayed on LCD 540 at the user's request. A graphical representation of a typical compass rose accompanies the digital reading and is updated in real-time as the diver changes heading.

In one embodiment, the memory system for unit 20 is comprised of erasable programmable read-only memory (EPROM) 504, static random access memory (SRAM) 506, and FLASH random access memory (RAM) 508. The memory is accessed by microcontroller 502 and is used for storage of program instructions and user data. Microcontroller 502 contains all the necessary internal logic required to directly interface these memory types as well as dynamic random access memory (DRAM), if so desired. Typically, the non-volatile memory is used to store program instructions (software), external pressure and temperature readings over time to be used for dive profile review, and any written messages/graphics the user wishes to store for later recall.

Audio output from unit 20 is used for alerting either the diver holding unit 20 or a nearby dive companion. Different alert tones of varying frequency and duration may be programmed to communicate specific alert messages. These alert tones are used primarily to attract a diver's attention so that he or she will look at his or her display or the display of an accompanying dive buddy. Audible tones are produced by transducer 522 mounted to casing 4 of unit 20. Transducer 522 is driven by an audio amplifier 520 which amplifies an analog signal generated as a result of PWM channel 516 of microcontroller 502 as filtered by low-pass filter 518. The audible tones are software controllable by varying the pulse modulation feeding audio amplifier 520 and transducer 522. The present design allows for the production of arbitrary analog waveforms which can take the form of voice commands and messages if so desired.

Boat finder/emergency beacon subsystem 554 is incorporated into unit 20 to facilitate finding a dive boat or any location marked with an appropriate ultrasonic transmitter. To operate subsystem 554, a diver enables the boatfind function and does a slow 360° spin in the water. Unit 20 concurrently monitors the signal strength from ultrasonic transducer 552 and the reading from compass sensor 562 to plot signal strength versus direction on LCD 540. The diver can use this information to help locate the transmitter source which would typically be hung from the dive boat. Currently, a boat finding transmitter is commercially available which produces a suitable signal for detection by unit 20.

The boat finder function is implemented using a 75 kHz ceramic style ultrasonic transducer 552 and subsystem electronics 554. Transducer 552 is a thin-film ceramic encapsulated in a high impact plastic cylinder which protrudes slightly from one side of casing 4 of unit 20 in this embodiment. Subsystem 554 contains conditioning elements for high-gain amplification, filtering, and detection of signals received from transducer 552. Detection signals are transferred to microcontroller 502 via interface control lines 558. Signal strength, indicating relative proximity to the source transmitter, is fed to the A/D subsystem 564 via receive level line 580. Both signals are interpreted by software for presentation to the diver in graphical and numerical formats. Subsystem 554 may also be used to locate another unit 20 configured with similar components. Transducer 552, when used as a transmitter can act as an emergency beacon, sends a repetitive ultrasonic signal that other units 20 can detect. Should a diver need immediate attention, he can select an emergency icon on his or her LCD 540 which causes unit 20 to send out an ultrasonic distress signal. This signal is generated using PWM channel 556 of microcontroller 502 to continuously drive transducer 552. This distress signal has a different pulse/chain signature than the boat find signal so that other units 20 can distinguish between a normal beacon and a distress beacon. The distress signal is transmitted indefinitely or until the diver explicitly cancels the operation. The ultrasonic distress beacon may be accompanied by a visible flashing beacon produced by flash assembly 570 of digital camera subsystem 574.

Digital camera subsystem (DCS) 574 is incorporated into unit 20 to allow for the capture of underwater static imagery. The camera function is implemented through the use of a conventional two-dimensional charge coupled device (CCD) 572, xenon flash unit 570, and interface electronics 574. Current miniature camera technology allows for the integration of a CCD camera sensor and associated electronics into a very small (e.g., 1.75 inches×1.75 inches) area. In one embodiment, the solid state camera has an integrated lens and electronic auto-iris shutter with a light sensitivity down to 0.05 LUX. Signals from microcontroller 502 control the flash and shutter functions of DCS 574 via interface control lines 578. Once CCD 572 is exposed, analog to digital interface circuitry in DCS 574 reads the image information from an array of CCD 572. The resulting digital values are transferred to FLASH RAM 508 for display on LCD 540, and/or compressed and stored for later recall. The stored image data can be in either color or monochrome format. Stored images can be downloaded to a host computer via serial host personal computer (PC) link 514.

Unit 20, in one embodiment, has the ability to transfer basic information from the one unit 20 to another unit 20 that is similarly configured. This information is in the form of variable-width pulse codes transferred using a 100 kHz ultrasonic transducer 530 in a manner similar to that of the boat finder function. A diver may transmit a code to another diver which would bring up a prestored message on the receiving diver's unit 20 display which may say, for example, "I need to surface", or "come over here". Arbitrary text messages and even sketches may be transferred from one unit to another if directional connectivity can be maintained for the duration of the transfer. The acceptance angle is determined by the size and frequency of transducer 530. In one embodiment, transfer of information occurs in a cone of approximately thirty degrees. Environmental factors such as water turbulence could also affect transmission.

Other configurations are possible as determined by design considerations. For example, lower frequency transducers have a greater range than higher frequency transducers, but are larger and would take up more space in unit 20. Other embodiments could use multiple transducers aimed away from unit 20 at various angles so that holding unit 20 at a particular angle with respect to a peer unit is not necessary for communication.

The transfer of ultrasonic codes in one embodiment shown is accomplished using 100 kHz ceramic transducer 530 and peer-to-peer communication subsystem 528. Transducer 530, in one embodiment, is a thin-film ceramic encapsulated in a hard plastic cylinder which protrudes slightly from the side of the unit 20 enclosure. Microcontroller 502 sends 8-bit ASCII codes via RS-232C serial link 524 to subsystem 528 where they are converted to variable width pulses. These pulses are amplified and sent on to transducer 530. Conversely, during reception, variable width pulses received from transducer 530 are amplified, filtered, and converted to 8-bit codes and sent to microcontroller 502 for interpretation. Because, in one embodiment, only one transducer is used per unit 20, interface control lines 526 carry control and mode logic so that transmission and reception functions can be handled appropriately by microcontroller 502.

A serial RS-232C interface line 514 is provided for transfer of information to and from a host PC. The link operates in an download mode in order to transfer various information stored during a dive to a host PC for display, storage, printout, and/or analysis. The downloaded data can include a dive profile, detailing such information as depth and water temperature over time. The downloaded data may also include graphics or messages stored using the basic writing tablet functions or images captured with digital camera subsystem 574.

Data may be uploaded to unit 20 via the same serial link 514. The data uploaded may be information and/or graphics pertaining to a specific dive site. The data could also be useful information on local sea life or an informative guide on a particular shipwreck or coral reef. Serial link 514 may also be used to update core software algorithms without opening casing 4 or performing hardware modifications.

The present invention has been described in terms of specific embodiments. The present invention is not limited to the specific embodiments described herein. For example, other embodiments may include a hand-held unit comprising only an electromagnetic pen digitizer and a flatpanel display assembly, while all other components required to perform the functions described herein are contained in a casing mounted on a diver's weight belt. One skilled in the art may make other modifications and alterations to the specific embodiments shown without departing from the spirit and scope of the invention as set forth in the following claims.

We claim:

1. An apparatus comprising:
    a submersible unit including a display screen, wherein the unit is watertight and pressure proof to a range of depths, including depths usually achieved by divers, including scuba divers;
    a removeably coupled digitizing pen for marking information on the display screen when the digitizing pen is in proximity to the display screen; and
    a microcontroller coupled to the display screen.

2. The apparatus of claim 1, wherein the unit further includes a communication subsystem coupled to the microcontroller for communicating written information while submerged to a screen of a second unit, wherein the second unit is an apparatus functionally identical to the unit.

3. The unit of claim 1, wherein the unit further comprises:
    an outer shell of a durable material; and
    a layer of silicon-based gel below the outer shell for protecting the unit from pressure and from moisture.

4. The apparatus of claim 1, wherein the unit further includes a memory device that stores the marked information.

5. The apparatus of claim 1, wherein the display screen comprises:
    a flatpanel assembly comprising,
        a protective glass plate forming a surface of the unit;
        a liquid crystal display (LCD) below the glass plate;
        a transflector surface below the LCD; and
        a lightguide below the transflector surface; and
    a digitizer sensor board coupled to the flatpanel assembly.

6. The apparatus of claim 5, wherein the unit further comprises a digitizer interface coupled to the digitizer sensor board for digitizing information to be displayed on the display screen.

7. The apparatus of claim 1, wherein the unit further comprises:
    an analog to digital (A/D) subsystem coupled to the microcontroller; and
    a locator subsystem coupled to the A/D subsystem for locating a transmitter.

8. The apparatus of claim 4, wherein the unit further comprises a digital camera subsystem coupled to the memory device and to the microcontroller, wherein the digital camera subsystem transmits captured images to the memory device for storage.

9. The apparatus of claim 7, wherein the unit further comprises a compass sensor coupled to the A/D subsystem for transmitting a compass reading to the memory device.

10. The apparatus of claim 7, wherein the unit further comprises a pressure/temperature sensor unit coupled to the A/D subsystem for sensing a local temperature and a local pressure and for transmitting the local temperature and the local pressure to the memory device.

11. The apparatus of claim 1, wherein the unit further comprises a link over which information is downloaded to a host computer and uploaded from the host computer.

12. The apparatus of claim 1, wherein the unit comprises:

a power source; and a power converter coupled to the power source.

13. The apparatus of claim 1, further comprising a power source removeably coupled to the unit through a power converter.

14. The apparatus of claim 13, wherein the power source is a portable battery, and wherein the apparatus further comprises a battery case, comprising:

an enclosure having an opening therein for inserting the battery;

a lid for covering the opening and enclosing the battery, including a sealing mechanism for protecting the battery from moisture and pressure;

a waterproof connecting mechanism for receiving an electrical coupling to the unit;

a latching device for holding the lid securely on the enclosure; and belt loops on the enclosure for fastening the battery case to a belt worn by a person.

15. A method for performing functions underwater, comprising the steps of:

marking information on a screen of a device by moving an electromagnetic pen in proximity to the screen;

storing the information in a memory of the device; and transmitting the information to a screen of another device.

16. The method of claim 15, wherein the step of storing includes holding the pen in proximity to a store icon on the screen.

17. The method of claim 16 further comprising the step of clearing the information from the screen by holding the pen in proximity to an icon on the screen.

18. The method of claim 16 further comprising the steps of:

holding the pen in proximity to an icon on the screen to display information represented by the icon on the screen; and transmitting the information to the screen of the other device.

19. The method of claim 18, wherein the information represented by the icon is an emergency message.

20. The method of claim 19, wherein the information represented by the icon is pressure/temperature information regarding an environment of the unit.

21. The method of claim 20, wherein the information represented by the icon is location information.

22. The method of claim 21, wherein the information represented by the icon is information relating to a dive event, including:

time-at-depth information;

dive duration information; and decompression information.

23. The method of claim 15, further comprising the steps of:

assigning an icon to the information to be stored;

displaying the assigned icon on the screen; and retrieving the information by placing the pen in proximity to the assigned icon on the screen.

24. The method of claim 15, further comprising the step of transmitting an audible tone from the device.

25. The method of claim 16, further comprising the step of placing the pen in proximity to an icon on the screen that represents the audible tone.

26. The method of claim 25, wherein the icon represents a written message to be sent to another unit and wherein the audible tone is transmitted in conjunction with sending the written message.

* * * * *